Feb. 10, 1931.　　　　K. A. CLARK　　　　1,791,797
PROCESS AND APPARATUS FOR SEPARATING AND TREATING BITUMINOUS SANDS
Filed May 5, 1928
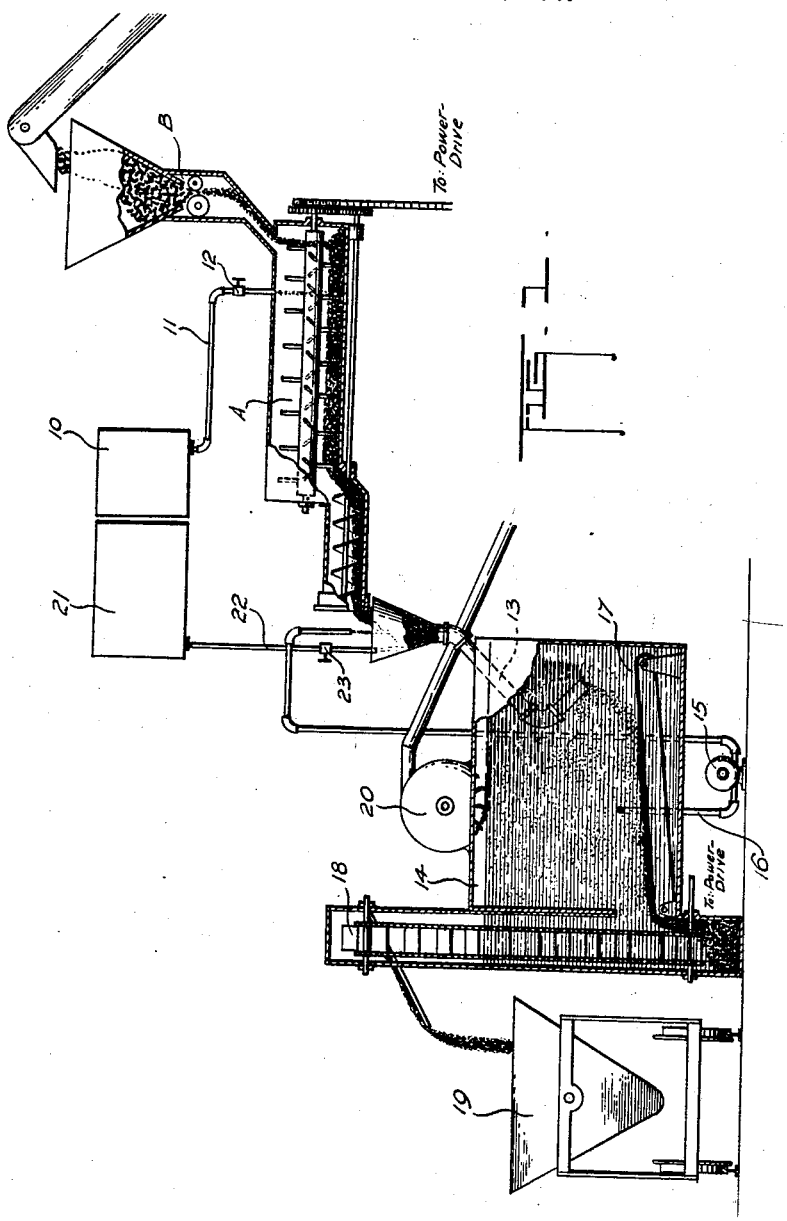
INVENTOR.
KARL ADOLF CLARK
By Fetherstonhaugh & Co
ATT'YS Patented Feb. 10, 1931

1,791,797

UNITED STATES PATENT OFFICE

KARL ADOLF CLARK, OF EDMONTON, ALBERTA, CANADA, ASSIGNOR TO THE GOVERNORS OF THE UNIVERSITY OF ALBERTA, OF EDMONTON, CANADA

PROCESS AND APPARATUS FOR SEPARATING AND TREATING BITUMINOUS SANDS

Application filed May 5, 1928. Serial No. 275,471.

This invention relates to a process and apparatus for separating and treating bituminous sands and like material into its bituminous and other constituents, one of the resulting products being composed almost wholly of the bituminous constituents of the material with only a small amount of other matter and the other product being composed of the other matter in which remains only a small quantity of bitumen.

There exist large deposits of native bituminous materials such for instance as the bituminous sands in the Athabaska region of northern Alberta, which consist of a mixture of bitumen with sand, silt or clay and a commercial process for the separation of the bituminous content of such deposits is highly desirable.

It is well known that the treatment of such materials with a solution of soap, silicate of soda, alkalies or alkaline salts will cause the drawing apart of the bitumen from the sand, clay or like material with which it is associated, and it has been proposed, after such treatment, to separate the bitumen from the other materials by washing in hot water. So far as I am aware, however, no process or apparatus has ever been suggested which will effect the separation on a commercial scale without leaving in association with the recovered bitumen a considerable quantity of the sand, silt or clay, this considerable unseparated residue substantially lessening the value of the separated bituminous component of the original material.

I have found that by controlling the quantity of the reagents originally added to the material to be treated and limiting such quantity to the amount necessary to prepare the material for separation, and by thereafter feeding the mixture of the material and the reagent solution in small quantities and with agitation into the hot water bath, the separation of the bitumen from the sand or other like material with which it was originally associated is affected much more completely than by means of any previously suggested process.

As reagents I use materials giving an alkaline reaction on hydrolysis. Using such reagents in the process described above, yields of bitumen containing less than 2% of other matter, calculated on a water-free basis, have been obtained in numerous laboratory runs and in the treatment of substantial quantities of original material of indifferent quality on a commercial scale, yields of bitumen containing less than 10% of other matter on a water free basis have been secured.

It is well known also that the coagulation of suspended or colloidal matter in water may be effected by the use of electrolytes. I have found that this coagulating effect may also be obtained in the plant water of a bituminous sand separation plant, whereby it will be possible to use the heated washing water continuously, and thus avoid the necessity of obtaining a constant fresh supply. Electrolytes suitable for this purpose are water soluble inorganic compounds of polyvalent metals, calcium chloride, calcium hydroxide and alums being examples of these. I have found that if a sufficient concentration of such electrolyte be maintained in the plant water to cause silicate of soda and silt to coagulate, or in other words effect flocculation of the silicate of soda with the silt, etc., these latter substances may be eliminated by settling them out and the plant water may be kept clean. The strength of electrolyte which must be maintained in the plant water to cause coagulation is less than a one percent solution.

I have found that the quantity of the reagent solution employed to prepare the material for separation of bitumen from the sand, silt or clay should, in the case of a silicate of soda solution, be about 20% by weight of the quantity of the material to be treated.

I have found that the quantity of reagent employed to prepare the material for separation of bitumen from the sand, silt or clay should amount in the case of commercial grades of liquid silicate of soda, to between 0.06% and 0.6% of the weight of material treated. The silicate of soda is dissolved in water and thoroughly mixed with the material being treated, the whole mixture being raised, during the mixing operation, to a temperature within the range of from 75° C.

to 100° C. The amount of water in which the silicate of soda is dissolved will be approximately equal to 20% of the weight of material treated. It must be adjusted, however, to such an amount as will make the mixture of suitable consistency for handling yet without causing the presence of excess solution. All the solution must be completely absorbed by the material under treatment, probably as water colloidally dispersed in the bitumen. At this stage, there has been no obvious drawing apart of bitumen from mineral matter. I then deliver the mixture of the original material and the reagent solution to the separating hot water bath in small quantities and under continuous agitation, preferably by means of a stream of hot water sufficient to convey the material from the mixing apparatus to the hot water bath, the stream being preferably delivered below the surface of the bath. The temperature of the hot water bath should be in the range of from 75° C. to 100° C. Other methods of delivery which have the effect of preventing the coalescence of the bituminous masses with the sand, silt or clay might, however, be equally effective for the purpose.

An example of the apparatus for carrying out the process is disclosed in the accompanying drawing in which Figure 1 is a side elevation partly in section.

Referring more particularly to the drawing, A represents a heating and mixing machine into which bituminous sand is introduced by suitable equipment B, such as a bucket elevator and roll crusher, and also into which some reagent, such as silicate of soda solution, is introduced in proper concentration and quantity, from a reservoir 10 through a pipe 11 provided with a control valve 12. The machine A feeds the bituminous sand prepared for separation into a pipe-like arrangement 13 which dips below the surface of a large body of hot water in a container 14. There is also fed into the pipe 13, along with the treated material, a stream of hot water produced by a pump 15 with its intake connected to the lower part of the container 14, as at 16. The stream of hot water washes the treated bituminous sand into the hot water in the container and disperses therein the separated particles of sand, silt or clay and small masses of water-containing bitumen. The former sinks to the bottom of the container 14 and is collected and eliminated by suitable devices such as a conveyor 17, bucket line 18 and dump car 19. The latter rises to the surface of the body of hot water and is removed by suitable means such as a skimming device 20 of well known construction. In order to prevent the accumulation in the washing water of the silicate of soda or other reagent which would cause the sand, silt or clay to remain persistently suspended and would tend to form an oil-in-water emulsion of the bitumen, a solution of a suitable electrolyte, such as calcium chloride, is introduced into the hot water from a reservoir 21 through a pipe 22 provided with a control valve 23. The quantity introduced is so controlled as to limit it to the amount necessary to cause the flocculation and precipitation of the silicate of soda and the sand silt or clay so that they can be readily eliminated and the washing water maintained in proper condition.

As many changes could be made in the above process, and many apparently widely different embodiments of my invention, within the scope of the claims, set forth without departing from the spirit or scope thereof, it is intended that all matter contained in the accompanying specification shall be interpreted as illustrative and not in a limiting sense.

What I claim is my invention is:

1. A process of separating bitumen from bituminous sand silt or clay which consists in mixing the compound with a reagent giving an alkaline reaction on hydrolysis, introducing the prepared mixture to a body of hot water to effect separation of the bitumen from the sand, silt or clay, introducing a water-soluble inorganic compound of a polyvalent metal into the hot water to coagulate the reagent and the silt or clay, and recovering the bitumen from the surface of the water.

2. A process of separating bitumen from bituminous sand, silt or clay which consists in preparing the bituminous material for separation by mixing it with a quantity of a reagent giving an alkaline reaction on hydrolysis, just sufficient to prepare the material for separation, introducing the prepared mixture to a large body of hot water to effect separation, introducing a suitable quantity of a water-soluble inorganic compound of a polyvalent metal to effect coagulation of the said reagent and the silt or clay, and recovering the bitumen from the surface of the water.

3. A process of separating bitumen from bituminous sand, silt, or clay which consists in preparing the bituminous material for separation by mixing it with a reagent giving an alkaline reaction on hydrolysis, introducing the mixture to a large body of hot water in small amounts at a time with agitation thereby separating the bitumen, introducing a water soluble inorganic compound of polyvalent metal to coagulate said reagent and the silt or clay, and recovering the bitumen from the surface of the wash water.

4. A process of separating bitumen from bituminous sand, silt or clay which consists in preparing the bituminous material by mixing it with a reagent producing an alkaline reaction on hydrolysis, and then introducing the mixture with agitation to a body of hot water to cause, simultaneously with its introduction thereinto, a dispersion of said mixture into its constituent parts.

5. In the process of separating bitumen from bituminous sand, silt or clay after the bituminous material has been mixed with a reagent giving an alkaline reaction on hydrolysis, the step of conveying the treated material by a small stream of hot water into a large body of washing water.

6. In the process according to claim 5 the introduction of that quantity of a water-soluble inorganic compound of a polyvalent metal which is approximately necessary to coagulate the reagents and the silt or clay.

7. In a process for separating bitumen from bituminous sand, silt or clay, in which the bituminous material together with reagents is introduced into a bath of hot water, the step which comprises adding a water soluble inorganic compound of a polyvalent metal to the hot water bath to coagulate the said reagents and the sand, silt or clay which, as a result of the introduction of the bituminous material, has been dispersed in the hot water.

In witness whereof I have hereunto set my hand.

KARL ADOLF CLARK.